United States Patent [19]

Grateau et al.

[11] Patent Number: 5,023,209
[45] Date of Patent: Jun. 11, 1991

[54] FAST FADING, HIGH REFRACTIVE INDEX PHOTOCHROMIC GLASS

[75] Inventors: Luc Grateau, Paris; Michel Prassas, Bourgogne, both of France

[73] Assignee: Corning France S.A., Avon Cedex, France

[21] Appl. No.: 581,789

[22] Filed: Sep. 13, 1990

[30] Foreign Application Priority Data

Oct. 12, 1989 [FR] France ................................. 8913346

[51] Int. Cl.$^5$ ............................ C03C 4/06; C03C 3/11
[52] U.S. Cl. ......................................... 501/13; 501/56; 501/903
[58] Field of Search ............................ 501/13, 56, 903

[56] References Cited

U.S. PATENT DOCUMENTS

| | | | |
|---|---|---|---|
| 3,630,765 | 12/1971 | Aranjo | 501/13 |
| 3,703,388 | 11/1972 | Aranjo et al. | 501/13 |
| 3,999,996 | 12/1976 | Faulstich et al. | 501/13 |
| 4,190,451 | 2/1980 | Hares et al. | 501/13 |
| 4,486,541 | 12/1984 | Gliemeroth et al. | 501/13 |
| 4,686,196 | 8/1987 | Gliemeroth et al. | 501/13 |
| 4,746,633 | 5/1988 | Mazeau et al. | 501/13 |
| 4,757,034 | 7/1988 | Prassas | 501/13 |
| 4,891,336 | 1/1990 | Prassas | 501/13 |

*Primary Examiner*—Mark L. Bell
*Attorney, Agent, or Firm*—C. S. Janes, Jr.

[57] ABSTRACT

This invention is directed to the preparation of silver halide-containing photochromic glasses exhibiting refractive indices between 1.585–1.610, Abbe numbers higher than 41, and densities less than 2.80 g/cm$^3$ generally consisting essentially, in weight percent, of:

| | | | |
|---|---|---|---|
| $SiO_2$ | 43–52 | SrO | 0.8–9 |
| $B_2O_3$ | 12.5–18 | BaO | 1–9 |
| $Al_2O_3$ | 0–3 | $K_2O$ | 2–9 |
| $ZrO_2$ | 3–8 | $TiO_2$ | 2–8 |
| $Li_2O$ | 1.5–3.5 | Ag | 0.100–0.175 |
| $Na_2O$ | 0.3–3 | Cl | 0.140–0.350 |
| $Nb_2O_5$ | 4–9 | Br | 0.093–0.180 |
| MgO | 0–5 | CuO | 0.0080–0.0300 |
| CaO | 0–5 | | |

3 Claims, No Drawings

FAST FADING, HIGH REFRACTIVE INDEX PHOTOCHROMIC GLASS

BACKGROUND OF THE INVENTION

The present invention relates to the preparation of transparent photochromic glasses displaying rapid darkening and clearing which are suitable for the production of ophthalmic lenses which have a refractive index ($n_d$) of at least 1.585 and less than or equal to 1.610.

These glasses are also characterized by an Abbe number ($\nu$) of between about 41 and 45, a density ($\rho$) of less than about 2 80 g/cm$^3$, a good chemical stability and a viscosity at the liquidus which is sufficient to enable them to be manufactured continuously and shaped using the conventional shaping techniques (viscosity at the liquidus of greater than or equal to about 200 poises).

These glasses can also undergo the customary cycles for the deposition in vacuo of thin layers (for example anti-reflection) and can do so without a significant change in their photochromic performances.

In the present context the glasses displaying rapid darkening and clearing or fading are understood to be glasses which, at ambient temperature, under the action of a source of actinic radiation, show a light transmittance on darkening at the end of 15 minutes of less than or equal to 48%, and a light transmittance of greater than about 60% 5 minutes after having been removed from actinic radiation illumination.

The majority of patents relating to photochromic glasses described compositions enabling products, which may or may not be for ophthalmic use, to be obtained which have a refractive index of 1.523.

The advantages of ophthalmic lenses having a high refractive index are numerous. In fact, the use of glasses having a high refractive index compared with conventional glasses ($n_d = 1.523$) enables the thickness of the edge (negative power) or of the center (positive power) to be reduced, for equal power.

However, in parallel with the increase in the refractive index a reduction in the Abbe number (that is to say, an increase in the dispersion of the glass) is generally observed. In order to avoid the defects generated by the increase in the dispersion of the glass, in particular the appearance of colored fringes at the edge of the lens, the high-index glass must have an Abbe number of not less than 41.

Linked to the variations in thickness, another advantage of the high-index lenses, which is not negligible, can be a lower weight. To achieve this it is important that the density of the glass is not too high. A density of less than or equal to 2.80 g/cm$^3$, and preferably less than 2.75 g/cm$^3$, is generally desirable in this regard.

Moreover, the photochromic glasses having a refractive index of the order of 1.6 are products intended to be sold in most cases with surface treatments which minimize the reflective losses.

These treatments are generally carried out by known techniques for deposition under vacuum, which necessitate bringing the glass to a temperature of about 280° C. It thus becomes essential that the photochromic properties of the proposed glass are not altered during this operation.

The photochromic glasses described in U.S. Pat. No. 4,891,336 (Prassas) have a high sensitivity to heat treatments carried out at temperatures between 200° and 300° C. The majority show a difference in light transmittance in the darkened state after exposure for 15 minutes to actinic radiation ($TD_{15}$) before and after deposition of antireflective layers which can be greater than 10 points, over the range of temperatures from 0° to 40° C.

By way of example we give the photochromic properties of glasses without and with an anti-reflecting layer in Table I. The glass compositions are those described in Examples 21 and 24 (Table IE) of the above-mentioned patent.

TABLE I

| Examples from U.S. Pat. No. 4,891,336 | Ex. 21 | | Ex. 24 | |
|---|---|---|---|---|
| Ag | 0.147 | 0.147 | 0.146 | 0.146 |
| Cl | 0.232 | 0.232 | 0.230 | 0.230 |
| Br | 0.159 | 0.159 | 0.154 | 0.154 |
| CuO | 0.020 | 0.020 | 0.0230 | 0.0230 |
| Sb$_2$O$_3$ | 0.40 | 0.40 | 0.54 | 0.54 |
| DEPOSIT | NO | YES | NO | YES |
| TD$_{20}$ | 42.4 | 55.7 | 43.0 | 58.9 |
| x$_{20}$ | 0.3437 | 0.3397 | 0.3415 | 0.3425 |
| y$_{20}$ | 0.3361 | 0.3361 | 0.3331 | 0.3383 |
| T$_o$ | 86.7 | 93.6 | 86.1 | 92.8 |
| TD$_{15}$ (0° C.) | 10.5 | 16.5 | 10.6 | 19.2 |
| TD$_{15}$ (25° C.) | 28.7 | 44.6 | 29.0 | 48.8 |
| TD$_{15}$ (40° C.) | 45.8 | 60.8 | 47.9 | 63.4 |
| TF$_5$ (25° C.) | 63.9 | 76.2 | 65.3 | 77.4 |
| DT$_{15}$ (40-25) | 17.1 | 16.2 | 18.9 | 14.7 |

As can be seen, the transmittances after darkening and clearing are 15 to 20 points higher than those of the original glass. This difference is substantially greater than that resulting from the presence of the anti-reflecting layer on its own, which is estimated to be about 4 points. A glass of this type is not acceptable.

One of the objectives of this invention is also to provide compositions in which the photochromic properties mentioned above are combined with small changes in said properties after deposition of anti-reflection layers.

More precisely, the present invention has for its primary objective to produce a photochromic lens having a high refractive index, displaying rapid darkening and clearing and capable of receiving an anti-reflection layer, said lens being formed from a glass for which the refractive index is between 1.585 and 1.610, the Abbe number is higher than 41 and the density is less than about 1.80 g/cm$^3$, characterized in that the said lens, for a thickness of 2 mm, has the following optical properties:

(a) the light transmittance in the clear state ($T_o$) of greater than or equal to about 85%;

(b) a light transmittance in the darkened state after exposure for 15 minutes to actinic radiation (TD$_{15}$) over the temperature range from 0° to 25° C. of less than about 48%;

(c) a light transmittance in the darkened state after exposure for 15 minutes to actinic radiation (TD$_{15}$) at 25° C. of more than about 20%;

(d) the fading rate at ambient temperature (20° to 25° C.) such that the glass has a light transmittance (TF$_5$) of at least 60% within 5 minutes after withdrawing from actinic radiation;

(e) the difference in light transmittance in the darkened state over the temperature range from 25° to 40° C. of less than 23 points of the degree of transmittance; and (f) the difference in absolute value of light transmittance in the darkened state before and after heat treatment at 280° C. for 1 hour, simulating an anti-reflection treatment, of less than 5 points of transmittance.

SUMMARY OF THE INVENTION

Those objectives can be achieved when the glass making up this lens is formed from a base glass having the following composition, in percent by weight on the oxide basis:

| | | | |
|---|---|---|---|
| $SiO_2$ | 43–52 | MgO | 0–5 |
| $B_2O_3$ | 12.5–18 | CaO | 0–5 |
| $Al_2O_3$ | 0–3 | SrO | 0.8–9 |
| $ZrO_2$ | 3–8 | BaO | 1–9 |
| $Li_2O$ | 1.5–3.5 | $K_2O$ | 2–9 |
| $Na_2O$ | 0.3–3 | $TiO_2$ | 2–8 |
| $Nb_2O_5$ | 4–9 | | | with the provisos that:
 $7 < X_2O < 12$ where $X_2O = Li_2O + K_2O$
 $2 < XO < 12$ where $XO = MgO + CaO + SrO + BaO$
 $12 < X_2O + XO < 20$
 $15 < ZrO_2 + TiO_2 + Nb_2O_5 < 22$
 $ZrO_2 + Al_2O_3 \leq 10$
 $Nb_2O_5 + Al_2O_3 \leq 9$
 $0.15 < Li_2O/X_2O < 0.40$
and photochromic elements in the following proportions, expressed in percent by weight:

| | | | |
|---|---|---|---|
| Ag | 0.100–0.175 | Br | 0.093–0.180 |
| Cl | 0.140–0.350 | CuO | 0.0080–0.0300 | where the Ag, Cl and Br contents are the contents analyzed in the glass and the copper oxide content is the content introduced in the vitrifiable batch, with the provisos that:
 $Ag + Br > 0.21$
 $Br + Cl > 0.24$ Preferably, the lens has (d) a $TF_5$ value of more than 62% (e) a difference in light transmittance in the darkened state over the temperature range from 25° to 40° C. of less than 20 points of transmittance, and (f) a difference in absolute value of light transmittance in the darkened state, before and after heat treatment at 280° C. for 1 hour simulating an anti-reflection treatment, of less than 4 points of transmittance. The base glass of this lens has the following composition in percent by weight, on the oxide basis:

| | | | |
|---|---|---|---|
| $SiO_2$ | 43–50 | $K_2O$ | 3–8 |
| $B_2O_3$ | 12.5–17 | CaO | 0–3 |
| $Al_2O_3$ | 0–1.5 | SrO | 1–7 |
| $ZrO_2$ | 3–8 | BaO | 1–7 |
| $Li_2O$ | 1.5–3 | $Nb_2O_5$ | 5–9 |
| $Na_2O$ | 0.3–2.5 | $TiO_2$ | 3–7 | and the photochromic elements are present in the following proportions, expressed in percent by weight:

| | | | |
|---|---|---|---|
| Ag | 0.100–0.155 | Br | 0.100–0.150 |
| Cl | 0.160–0.310 | CuO | 0.0120–0.0200 | with the provisos that
 $Ag + Br > 0.22$
 $Br + Cl > 0.27$

Property (e) reflects the heat dependence of the glasses according to the invention and, in relation with the properties (a), (b), (c) and (d), describes the optical characteristics of the lens over the temperature range from 20° to 40° C.

The property (f) reflects the behaviour of the glass when it is subjected to heat treatments in the range from 240° to 300° C.

The two elements Ag and Br are critical, not only for obtaining photochromic glasses having the desired properties, but also for controlling the size of the particles of silver halides.

In fact, if the sum $Ag + Br$ is less than 0.21%, the dimensions of the particles of silver halides precipitated are such that the glass is opalescent [significant diffusion of light (haze)] and not suitable for the desired applications. To prevent this troublesome phenomenon, this sum is preferably greater than 0.22%.

Chlorine is used in an amount of between 0.14% and 0.35%, and preferably between 0.16% and 0.31%, as percentage by weight analyzed in the glass. It is an indispensable element which, when it is used in suitable proportions, enables the desired photochromic properties to be obtained. Too low a chlorine content leads to glasses which darken insufficiently or to a mediocre stability during the vacuum deposition operations, while too high a content reduces the efficiency of the glass in fading.

Moreover, we have found that in order to satisfy the demands relating to good behaviour during the vacuum deposition operations, the sum $Br + Cl$ must necessarily be above 0.24% and preferably above 0.27%.

The copper oxides, and in particular copper in the oxidation state +1, play the role of a sensitizer for silver halides, and, because of this, their content must be carefully controlled. In fact, if there is less than 0.0080% of CuO, the darkening of the glass is insufficient. On the other hand, above 0.0300% of CuO the glass has a heat dependency $[DT_{15}(25°-40° C.)]$ clearly greater than that which it is desired to have.

The limits of the ranges specified above for the constituents of the compositions of the base glass are also crucial for obtaining glass having good suitability for melting and shaping, and possessing the chemical and physical properties (for example, strengthening by chemical and/or physical tempering and good durability) demanded of glasses used in optical and ophthalmic applications, as well as the desired photochromic behaviour.

The capacity for precipitating silver halides in an appropriate temperature range depends on the $B_2O_3$ content of the glass. For glasses having a low alumina content, such as are defined in the present invention, said $B_2O_3$ content must not be less than 12.5%. On the other hand, it is known that $B_2O_3$ has an adverse effect on the chemical stability of the glass, and its maximum value therefore must not exceed 18%, preferably will not exceed 17%.

$Al_2O_3$ generally counters the natural tendency of glasses to demix. However, we have found that this tendency, which is well known to those skilled in the art, does not hold good for the compositions containing a high proportion of oxides such as the $Nb_2O_5$ and $TiO_2$. Moreover, the compositions containing this oxide in concentrations above 3% by weight have a high sensitivity to subsequent treatments (for example, deposition under vacuum). For this reason its maximum content must not exceed 3% by weight, preferably 1.5%.

$ZrO_2$ promotes a good stability to bases and contributes significantly to the increase in the refractive index.

Moreover, the effect of this oxide is not neutral with respect to the photochromic properties. In fact, like $Al_2O_3$, it affects the capability of the composition to retain the elements Ag, Cl, and Br. In the presence of $Al_2O_3$ this oxide must be present in the glass in an amount of at least 3%, and in the absence of A1203 it must be present in a proportion of at least 5%.

The major disadvantage of $ZrO_2$ is the rapid increase in the tendency of the glass to devitrify. Its maximum value must be such that the sum $Al_2O_3 + ZrO_2$ does not exceed 10%.

Apart for their contribution to the density, the presence of the alkali metals ($Li_2O$, $Na_2O$, $K_2O$) is essential in order to obtain the desired photochromic behaviour.

Amongst the alkali metals, $Li_2O$ is that which enables the desired fading speeds to be achieved and it must be present in the glass composition in an amount of at least 1.5%. However, this oxide substantially lowers the viscosity of the glass and increases its tendency to devitrification and to phase separation. Its maximum content must not be greater than 3.5% and preferably not greater than 3%.

$Na_2O$ appears to increase the mechanical strength which can be obtained by chemical strengthening. Consequently, the glasses preferably contain at least 0.3% of $Na_2O$. The maximum content does not exceed 3% and preferably does not exceed 2.5%, because of the detrimental effect of this oxide on the speed at which the glass fades.

$K_2O$ is used in a proportion of from 2 to 9% and preferably of from 3 to 8% by weight on the oxide basis. It is used in a complementary manner to $Li_2O$ and enables a good level of darkening to be maintained without affecting the speed of fading too greatly by opposition to $Na_2O$.

Moreover, the contents of alkali metal oxides must satisfy the following conditions:

$7 < X_2O < 12$
$0.15 < Li_2O\ 0.40$ where $X_2O$ is the sum of the oxides $Na_2O$, $K_2O$ and $Li_2O$.

The main constituent intended to increase the refractive index is $Nb_2O_5$. In fact, this oxide has an effect close to that of $TiO_2$ with regard to the contribution to the refractive index, but it has a lesser effect on the dispersion of the glass.

Its minimum content must not be less than 4% and preferably not less than 5%. However, because of its high cost, its content must not be more than 9%. For this latter reason, $TiO_2$ will be present in the composition in an amount of at least 2%. At high concentrations, $TiO_2$ imparts an undesirable yellow tint to the glass and makes the glass more subject to phase separation. Its maximum content must not exceed 8% and, preferably, must be less than or equal to 7%.

With the aim of increasing the refractive index of the glass, oxides such as MgO, CaO, SrO and BaO could also be added to the base system. Amongst the divalent oxides, MgO and CaO make a small contribution to the density, but also to the refractive index. However, although glasses having the desired photochromic properties can be obtained with these oxides, it is preferred to use strontium oxide and barium oxide, which lead to glasses which are more stable in respect of devitrification and phase separation. Moreover, in order to obtain, preferably, a density lower than 2.75 g/cm$^3$, SrO will be used in a proportion of at least 0.8%. For reasons of devitrification and phase separation, its maximum value must not exceed 9% and preferably not exceed 7%, Barium oxide will be present in the glass in a proportion of at least 1% and at most 9%, preferably at most 7%.

In all cases in order to satisfy the demands relating to the refractive index and the density, the sum XO of the divalent metals must satisfy the following condition:

$2\ XO\ 12$ and preferably $2 < XO\ 10$

When the glass contains alkali metals ($Li_2O$, $Na_2O$, $K_2O$) and divalent metals at the same time, in order to preserve the stability of the glass in respect of devitrification, the following condition must be satisfied:

$12 < X_2O + XO < 20$

With the limitations specified above and the desired characteristics, the oxides making a substantial contribution to the index, such as $ZrO_2$, $TiO_2$ and $Nb_2O_5$, must, in general, satisfy the following condition:

$15 < ZrO_2 + TiO_2 + Nb_2O_5 < 22$

The compositions satisfying the conditions specified above lead to glasses having all the optical and photochromic characteristics specified above.

The natural tint of the glasses satisfying the above conditions is grey or grey-brown. A brown colour can be obtained by adding noble metals such as Pd or Au, or oxides such as $Sb_2O_3$, SnO and $As_2O_3$, or with a combination of several of these constituents.

In all cases the content of noble metals, for reasons of excessive coloration in the clear state, must not exceed 6 ppm (parts per million) and that of the oxides $Sb_2O_3$, $As_2O_3$ and $SnO_2$ must not exceed 0.15%. In fact, the latter, being powerful reducing agents, are able, in amounts of more than 0.15%, to precipitate silver and/or copper in the metal form and to induce undesirable colorations.

The colour in the clear state can be regulated, in order to give an agreeable and an aesthetically pleasing colour to the glass, with the aid of colorants such as $Er_2O_3$, CoO or $Nd_2O_3$ in customary amounts.

Prior Art

U.S. Pat. No. 3,630,765 (Araujo) discloses the fabrication of photochromic glasses exhibiting high indices of refraction through the presence of $Ta_2O_5$ in amounts of 10-50% by weight in alkali metal borosilicate base compositions containing silver halides. Such glass compositions are quite remote from those of the instant invention.

U.S. Pat. No. 3,703,388 (Araujo et al.) describes the preparation of photochromic glasses of high refractive indices consisting of lanthanum borate base compositions containing silver halides. Such glass compositions are again quite remote from those of the instant invention.

U.S. Pat. No. 3,999,996 (Faulstich et al.) reports the production of photochromic glasses demonstrating high indices of refraction consisting of high lead (26-30% PbO) aluminoborosilicate host compositions containing silver halides. Such glass compositions are yet again quite remote from those of the present invention.

U.S. Pat. No. 4,486,541 (Gliemeroth et al.) records the formation of BaO-free, silver halide-containing photochromic glasses with high refractive indices consisting essentially, in weight percent, of 0.5-6% $Li_2O$, 6-12% $K_2O$, 2-24% alkaline earth oxides, 1.5-10% $ZrO_2$, 14.5-27% $B_2O_3$, 0.5-12% PbO, 0.5-8% $TiO_2$, and 32–47% SiO₂. Although there is some similarity between the above components and those of the present invention, the absence of BaO and Nb₂O₅ and the presence of PbO clearly distinguish the glass compositions of the patent from those of the instant invention.

U.S. Pat. No. 4,686,196 (Gliemeroth et al.) discusses silver halide-containing ophthalmic photochromic glass lenses with high refractive indices of refraction consisting essentially, in weight percent, of 3–9% $Li_2O$, 3–12% MgO, 3.06–6.74% $TiO_2$, 2–11% $ZrO_2$, 2.28–8% $Nb_2O_5$, 11–16% $B_2O_3$, and 42–56% $SiO_2$. Whereas there is potential overlap in part between those composition intervals and the ranges of the subject invention, the thrust of the patented glasses to secure high indices of refraction was quite different. Thus, as stated in the patent, the high refractive indices were achieved through unique interactions of such components as $TiO_2$ and $ZrO_2$ with $Li_2O$. Hence, although the patent discloses $Li_2O$ contents as low as 3%, the $Li_2O$ levels in the working examples ranged from 6.5–8.84%, far above the maximum that can be tolerated in the glasses of the present invention. Furthermore, the patent does not demand the critical combinations of Ag, Br, Cl, and CuO required in the subject inventive glasses to obtain the desired photochromic properties.

European Patent 63,790 (Schott) discloses photochromic glasses exhibiting refractive indices of at least 1.59 consisting essentially, in weight percent on the oxide basis, of

| | | | |
|---|---|---|---|
| $SiO_2$ | 10–60 | $ZrO_2$ | 1–12 |
| $B_2O_3$ | 14.5–42 | $La_2O_3$ | 0–23 |
| $P_2O_5$ | 0–40 | $Nb_2O_5$ | 0–25 |
| $Al_2O_3$ | 0–15 | $SiO_2 + B_2O_3 + P_2O_5$ | 51–76 |
| MgO | 0–5 | $WO_3$ | 0–7 |
| $Ta_2O_5$ | 0–18 | PbO | 0–16 |
| CaO | 0–8 | $Al_2O_3 + ZrO_2 + La_2O_3 + Nb_2O_5 + Ta_2O_5 + WO_3$ | 5–30 |
| SrO | 0–24 | $TiO_2$ | 0–14 |
| BaO | 0–4 | $ZnO + SnO_2 + PbO + TiO_2$ | 2–25 |
| $Li_2O$ | 0–8 | $MgO + CaO + SrO + BaO$ | 0–24 |
| ZnO | 0–6 | $Na_2O$ | 0–12 |
| $SnO_2$ | 0–3 | $K_2O$ | 0–16 |
| $Ag_2O$ | ≧0.05 | Remainder | <10 |
| Halogens | ≧0.25 | CuO | 0–0.1 |

It is immediately apparent that such extremely broad ranges overlap the composition intervals of the present invention. Nevertheless, the mechanism for securing high refractive index to the patented glass appears to be quite different from that underlying the instant inventive glasses. To illustrate, PbO in substantial amounts appears in all but one of the working examples supplied in the patent. BaO is not included in any of the working examples of the patent; yet, it is a required component in the glasses of the subject invention. Finally, there is no requirement in the patent for the critical combination of photochromic elements.

U.S. Application Ser. No. 07/349,693, filed May 10, 1989 by R. J. Araujo under the title HIGH REFRACTIVE PHOTOCHROMIC GLASSES, describes the preparation of photochromic glasses demonstrating refractive indices greater than 1.59 consisting essentially, in approximate weight percent on the oxide basis, of:

| | | | | | |
|---|---|---|---|---|---|
| $SiO_2$ | 34–50 | $Nb_2O_5$ | 0–11 | SrO | 0–26 |
| $B_2O_3$ | 14–22 | $TiO_2$ | 0–10 | BaO | 0–24 |
| $ZrO_2$ | 6–15 | $La_2O_3$ | 0–7 | $Li_2O$ | 0–5 |
| $K_2O$ | 2–12 | ZnO | 0–4 | $Na_2O$ | 0–5 |
| $Al_2O_3$ | 0–8 | CaO | 0–9 | $Li_2O + Na_2O + K_2O$ | 2–15 | to which are added photochromic elements in weight percent in excess of 100% along with the optional inclusion of fluoride

| | | | |
|---|---|---|---|
| Ag | 0.15–0.4 | CuO | 0.005–0.05 |
| Cl | 0.3–0.65 | F | 0–0.6 |
| Br | 0.2–0.65 | | |

The principal thrust of those glasses was to obtain the high refractive index through a combination of $ZrO_2$ + $K_2O$ with, optionally, $Li_2O$, or with lower levels of $K_2O$ and at least one alkaline earth metal oxide. Accordingly, although there is overlap between the above ranges and the composition intervals of the subject invention (except for the Br content), none of the working examples provided in the patent application has a base composition coming within the ranges of the instant invention.

DESCRIPTION OF PREFERRED EMBODIMENTS

Table II below shows glass compositions, expressed in parts by weight based on the oxides, which illustrate the products of the invention. Given that the total of the individual constituents is equal to or very close to 100, the values indicated can be regarded for all practical means as representing percentages by weight.

Given that it is not known with which cation(s) the halogens are combined and that their proportions are very low, the latter are shown simply in the form of chlorine and bromine in accordance with the usual practice. Finally, as silver is present in a very small amount it is shown simply in the form of the metal.

Unless indicated otherwise, the values given for the elements Ag, Cl and Br are the analyzed values. Only the concentrations of copper oxides are expressed in percent of the composition introduced. In fact, the retentions of this oxide are generally of the order of 98 to 100%.

The ingredients of the vitrifiable starting mixture can comprise all materials, whether oxides or other compounds, which, when they are melted together, are converted to the desired oxide in the desired proportions. The halogens Cl and Br will generally be added in the form of alkali metal halides. The components used to tint the glass will generally be added in the form of oxides or salts of the metals concerned.

A few starting materials supplying the various constituents of the glass in the case of a practical implementation are given by way of examples.

| | | | |
|---|---|---|---|
| $SiO_2$ | ground silica | | |
| $B_2O_3$ | boric acid | $B(OH)_3$ | |
| $Al_2O_3$ | calcined alumina | $Al_2O_3$ | |
| $ZrO_2$ | zirconium oxide | $ZrO_2$ | |
| $Li_2O$ | lithium carbonate | $Li_2CO_3$ | |
| $Na_2O$ | sodium nitrate | $NaNO_3$ | |
| $K_2O$ | potassium carbonate | $K_2CO_3$ | |
| | potassium nitrate | $KNO_3$ | (in a proportion of approximate 2% by weight of oxide equivalent) |
| SrO | strontium carbonate | $SrCO_3$ | |
| BaO | barium carbonate | $BaCO_3$ | |

-continued

| | | |
|---|---|---|
| Ag | silver nitrate | AgNO3 |
| Cl | sodium chloride | NaCl |
| Br | sodium bromide | NaBr |
| CuO | copper oxide | CuO |
| Pd | palladium chloride | PdCl2 |
| Sb2O3 | antimony oxide | Sb2O3 |

The ingredients of the vitrifiable mixture are weighed, mixed carefully with one another in the ball mill in order to promote a homogeneous molten mass being obtained, and then transferred progressively into a platinum crucible heated by the Joule effect to about 1250° C. When the vitrifiable mixture is completely molten, the temperature of the melt is brought to about 1350°–1430° C. in order to ensure homogeneity and refining. The glass melt is then cooled to the temperature corresponding to the viscosity adequate for its shaping.

After shaping, the glass is annealed to about 450° C. The samples of glasses mentioned in Table II were introduced into an electrically heated furnace and exposed to the periods in minutes and to the temperatures in ° C. indicated in Table III.

The samples were then removed from the furnace and ground and polished to a thickness of about 2 mm. In general, temperatures of between about 630° and 680° C. proved satisfactory for obtaining the desired optical properties.

Table III also records measurements of the photochromic behaviour, as well as the colour of the glasses, along with the refractive index (R.I.), the Abbe number (Abbe), and the density (Dens.), where measured.

The colour of the glass is defined by the trichromatic coordinates (x, y) determined by the trichromatic colorimetric system of the C.I.E. in 1931 using the Illuminant C as the light source. This colorimetric system and this light source are explained by A. C. Hardy in the Handbook of Colorimetry, Technology Press, M.I.T., Cambridge, Mass., U.S.A. (1936).

The colour in the darkened state $(x_{20}, y_{20})$ is determined after exposure for 20 minutes at 25° C. under an ultra-violet light source (B.L.B. Black-Light-Blue lamp). The corresponding transmittance is indicated by $TD_{20}$.

The light transmittances reflecting the behaviour of the glasses under the action of actinic radiation similar to solar radiation have been measured with the aid of the solar simulator apparatus for which the principle is described in U.S. Pat. No. 4,190,451.

In Table III:

$T_o$ denotes the light transmittance in the clear state (non-darkened) of a glass;

T15 (25° C.) denotes the light transmittance in the darkened state of a glass after exposure for 15 minutes to a solar simulation source of actinic radiation at 25° C.;

TF5 (25° C.) denotes the light transmittance after fading of a glass 5 minutes after having been withdrawn from the solar simulation source of actinic radiation at 25° C.;

D15 (25°–40° C.) notes the difference in light transmittance in the darkened state of a glass over the temperature range ranging from 25° C. to 40° C.

DT denotes the absolute difference in light transmittance in the darkened state of a glass at 25° C. before and after heat treatment simulating a vacuum deposition treatment (280° C. for 1 hour).

The measurements of the refractive index and of the Abbe number were carried out by the customary methods (the yellow ray of He was used for $n_d$) on the annealed sample.

The density was measured by the immersion method and expressed in $g/cm^3$.

The invention is illustrated by the non-limiting Examples 1 to 26.

Examples 1 to 9 are representative of compositions of photochromic glasses of grey colour which do not contain $Al_2O_3$.

Examples 10 to 13 are representative of compositions of photochromic glasses containing $Al_2O_3$ and having a brown colour.

Examples 14 to 18 are representative of compositions of photochromic glasses without $Al_2O_3$ and having a brown colour.

Examples 19 to 20 are representative of compositions of photochromic glasses displaying slight darkening (comfort-type glass).

Examples 21 to 22 are representative of compositions of photochromic glasses having a brown colour and containing Pd and $Sb_2O_3$.

Examples 23 to 26 represent compositions in which the sum Cl +Br is outside the range claimed.

Examples 4, 5, 8, 13, 14, 15 and 21 are illustrative of preferred embodiments amongst all of the glasses according to the invention, not solely because of their photochromic properties, but also in consideration of their overall physical and chemical properties.

TABLE II

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| SiO2 | 48.31 | 48.31 | 48.31 | 48.31 | 48.31 | 48.31 | 48.31 | 47.89 | 48.10 | 45.96 | 47.41 | 46.51 | 46.24 |
| B2O3 | 14.91 | 14.91 | 14.91 | 14.91 | 14.91 | 14.91 | 14.91 | 14.78 | 14.84 | 16.71 | 16.18 | 16.91 | 16.81 |
| Al2O3 | — | — | — | — | — | — | — | — | — | 2.17 | 2.18 | 2.19 | 2.18 |
| ZrO2 | 7.44 | 7.44 | 7.44 | 7.44 | 7.44 | 7.44 | 7.44 | 7.38 | 7.41 | 4.55 | 4.59 | 4.61 | 4.58 |
| Li2O | 1.73 | 1.73 | 1.73 | 1.73 | 1.73 | 1.73 | 1.73 | 1.71 | 1.72 | 2.29 | 2.87 | 2.88 | 2.59 |
| Na2O | 1.07 | 1.07 | 1.07 | 1.07 | 1.07 | 1.07 | 1.07 | 1.06 | 1.07 | 1.15 | 1.15 | 1.16 | 1.15 |
| K2O | 5.34 | 5.34 | 5.34 | 5.34 | 5.34 | 5.34 | 5.34 | 5.30 | 5.32 | 6.20 | 4.49 | 4.51 | 5.36 |
| Nb2O5 | 8.09 | 8.09 | 8.09 | 8.09 | 8.09 | 8.09 | 8.09 | 8.03 | 8.06 | 6.63 | 6.68 | 6.71 | 6.67 |
| TiO2 | 5.57 | 5.57 | 5.57 | 5.57 | 5.57 | 5.57 | 5.57 | 5.52 | 5.55 | 6.64 | 6.69 | 6.72 | 6.68 |
| SrO | 1.80 | 1.80 | 1.80 | 1.80 | 1.80 | 1.80 | 1.80 | — | 0.90 | 5.74 | 5.79 | 5.81 | 5.78 |
| BaO | 5.73 | 5.73 | 5.73 | 5.73 | 5.73 | 5.73 | 5.73 | 8.33 | 7.04 | 1.95 | 1.97 | 1.98 | 1.97 |
| Ag | 0.119 | 0.137 | 0.129 | 0.126 | 0.124 | 0.124 | 0.123 | 0.132 | 0.153 | 0.132 | 0.138 | 0.131 | 0.134 |
| Cl | 0.199 | 0.200 | 0.145 | 0.219 | 0.227 | 0.228 | 0.235 | 0.220 | 0.206 | 0.310 | 0.310 | 0.324 | 0.310 |
| Br | 0.110 | 0.115 | 0.132 | 0.101 | 0.130 | 0.125 | 0.099 | 0.108 | 0.106 | 0.143 | 0.166 | 0.152 | 0.149 |
| CuO | 0.015 | 0.015 | 0.015 | 0.015 | 0.015 | 0.013 | 0.015 | 0.0200 | 0.0200 | 0.020 | 0.015 | 0.0150 | 0.015 |
| Pd (ppm) | — | — | — | — | — | — | — | — | — | 3.0 | 3.00 | 3.00 | 3.00 |
| Sb2O3 | — | — | — | — | — | — | — | — | — | — | — | — | — |
| Cl + Br | 0.31 | 0.32 | 0.28 | 0.32 | 0.36 | 0.35 | 0.33 | 0.33 | 0.31 | 0.45 | 0.48 | 0.48 | 0.46 |

TABLE II-continued

| | Examples | | | | | | | | | | | | |
|---|---|---|---|---|---|---|---|---|---|---|---|---|
| | 14 | 15 | 16 | 17 | 18 | 19 | 20 | 21 | 22 | 23 | 24 | 25 | 26 |
| $SiO_2$ | 46.62 | 48.31 | 48.31 | 48.31 | 48.31 | 48.31 | 48.31 | 48.31 | 48.31 | 48.31 | 48.31 | 48.31 | 48.31 |
| $B_2O_3$ | 16.26 | 14.91 | 14.91 | 14.91 | 14.91 | 14.91 | 14.91 | 14.91 | 14.91 | 14.91 | 14.91 | 14.91 | 14.91 |
| $Al_2O_3$ | — | — | — | — | — | — | — | — | — | — | — | — | — |
| $ZrO_2$ | 7.51 | 7.44 | 7.44 | 7.44 | 7.44 | 7.44 | 7.44 | 7.44 | 7.44 | 7.44 | 7.44 | 7.44 | 7.44 |
| $Li_2O$ | 1.74 | 1.73 | 1.73 | 1.73 | 1.73 | 1.73 | 1.73 | 1.73 | 1.73 | 1.73 | 1.73 | 1.73 | 1.73 |
| $Na_2O$ | 1.08 | 1.07 | 1.07 | 1.07 | 1.07 | 1.07 | 1.07 | 1.07 | 1.07 | 1.07 | 1.07 | 1.07 | 1.07 |
| $K_2O$ | 5.39 | 5.34 | 5.34 | 5.34 | 5.34 | 5.34 | 5.34 | 5.34 | 5.34 | 5.34 | 5.34 | 5.34 | 5.34 |
| $Nb_2O_5$ | 8.17 | 8.09 | 8.09 | 8.09 | 8.09 | 8.09 | 8.09 | 8.09 | 8.09 | 8.09 | 8.09 | 8.09 | 8.09 |
| $TiO_2$ | 5.62 | 5.57 | 5.57 | 5.57 | 5.57 | 5.57 | 5.57 | 5.57 | 5.57 | 5.57 | 5.57 | 5.57 | 5.57 |
| SrO | 1.82 | 1.80 | 1.80 | 1.80 | 1.80 | 1.80 | 1.80 | 1.80 | 1.80 | 1.80 | 1.80 | 1.80 | 1.80 |
| BaO | 5.78 | 5.73 | 5.73 | 5.73 | 5.73 | 5.73 | 5.73 | 5.73 | 5.73 | 5.73 | 5.73 | 5.73 | 5.73 |
| Ag | 0.129 | 0.126 | 0.124 | 0.124 | 0.124 | 0.121 | 0.122 | 0.138 | 0.139 | 0.147 | 0.133 | 0.143 | 0.148 |
| Cl | 0.248 | 0.248 | 0.210 | 0.210 | 0.210 | 0.206 | 0.233 | 0.26 | 0.265 | 0.114 | 0.116 | 0.115 | 0.097 |
| Br | 0.097 | 0.101 | 0.120 | 0.120 | 0.120 | 0.120 | 0.132 | 0.111 | 0.111 | 0.101 | 0.102 | 0.115 | 0.109 |
| CuO | 0.015 | 0.015 | 0.015 | 0.015 | 0.015 | 0.015 | 0.015 | 0.015 | 0.015 | 0.015 | 0.015 | 0.015 | 0.015 |
| Pd (ppm) | 3.00 | 3.00 | 3.00 | 3.00 | 3.00 | 1.00 | 2.00 | 3.00 | 3.00 | — | — | — | — |
| $Sb_2O_3$ | — | — | — | — | — | — | — | 0.0136 | 0.0205 | — | — | — | — |
| Cl + Br | 0.35 | 0.35 | 0.33 | 0.33 | 0.33 | 0.33 | 0.36 | 0.37 | 0.38 | 0.21 | 0.22 | 0.23 | 0.21 |

TABLE III

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| T °C.-Temps. | 670-15 | 670-15 | 670-15 | 670-15 | 670-15 | 670-15 | 670-15 | 670-15 | 670-15 | 630-15 | 630-15 | 630-15 | 630-15 |
| $TD_{20}$ | 51.4 | 47.7 | 54.1 | 47.7 | 51.7 | 50.4 | 44.7 | 52.2 | 46.3 | 46.6 | 50.6 | 51.2 | 46.3 |
| $x_{20}$ | 0.3194 | 0.3198 | 0.3222 | 0.3187 | 0.3192 | 0.3208 | 0.3249 | 0.3197 | 0.3191 | 0.3314 | 0.3326 | 0.3316 | 0.3333 |
| $y_{20}$ | 0.3242 | 0.3236 | 0.3274 | 0.3229 | 0.3240 | 0.3244 | 0.3252 | 0.3256 | 0.3242 | 0.3330 | 0.3335 | 0.3334 | 0.3333 |
| DT | 2.9 | 3.2 | 1.6 | 2.8 | 0.6 | 0.9 | 0.6 | 1.0 | — | 1.4 | 4.69 | 3.78 | 1.72 |
| $T_o$ | 89.2 | 88.9 | 89.7 | 88.8 | 89.6 | 89.4 | 87.0 | 89.0 | 89.0 | 87.7 | 86.5 | — | — |
| $TD_{15}$ (25° C.) | 35.0 | 30.2 | 39.2 | 31.0 | 38.1 | 33.5 | 28.8 | 36.0 | 30.0 | 30.8 | 32.1 | — | — |
| $TD_{15}$ (40° C.) | 53.5 | — | 60.0 | 50.1 | 54.9 | 50.0 | — | 55.0 | 48.0 | 49.0 | 50.4 | — | — |
| $TF_5$ (25° C.) | 71.2 | 66.0 | 75.9 | 68.0 | 71.2 | 67.0 | 64.8 | 70.0 | 66.0 | 63.7 | 68.8 | — | — |
| $DT_{15}$ (40-2) | 18.5 | — | 20.8 | 19.1 | 16.8 | 16.5 | — | 19.0 | 18.0 | 18.2 | — | — | — |
| R.I. | 1.599 | — | — | — | — | — | — | 1.602 | 1.60069 | 1.596 | 1.598 | 1.599 | — |
| Abbe | 42.2 | — | — | — | — | — | — | 42.3 | 42.4 | 43.0 | 42.9 | 42.8 | — |
| Dens. | 2.73 | — | — | — | — | — | — | 2.75 | 2.74 | 2.69 | 2.69 | 2.69 | — |

| | Examples | | | | | | | | | | | | |
|---|---|---|---|---|---|---|---|---|---|---|---|---|---|
| | 14 | 15 | 16 | 17 | 18 | 19 | 20 | 21 | 22 | 23 | 24 | 25 | 26 |
| T °C.-Temps. | 670-15 | 670-15 | 680-15 | 670-15 | 670-30 | 680-15 | 670-15 | 670-15 | 670-15 | 670-15 | 670-15 | 670-15 | 670-15 |
| $TD_{20}$ | 47.5 | 46.3 | 46.2 | 49.2 | 46.6 | 51.6 | 53.4 | 44.93 | 46.56 | 47.4 | 43.3 | 53.6 | 48.1 |
| $x_{20}$ | 0.3361 | 0.3336 | 0.3330 | 0.3318 | 0.3323 | 0.3225 | 0.3252 | 0.3350 | 0.3336 | 0.3400 | 0.3394 | 0.3317 | 0.3407 |
| $y_{20}$ | 0.3353 | 0.3314 | 0.3306 | 0.3317 | 0.3298 | 0.3274 | 0.3291 | 0.3322 | 0.3323 | 0.3391 | 0.3352 | 0.3354 | 0.3398 |
| DT | 0.1 | 0.4 | 2.7 | 1.7 | 2.4 | 0.1 | 0.3 | 0.3 | — | 10.4 | 16.3 | 7.2 | 7.9 |
| $T_o$ | — | — | 87.0 | 86.4 | 85.3 | — | 88.4 | — | 87.0 | 86.8 | 85.5 | 87.0 | 86.4 |
| $TD_{15}$ (25° C.) | — | 28.0 | 32.0 | 29.9 | 28.6 | — | 41.3 | — | 31.3 | 30.4 | 21.0 | 35.2 | 30.2 |
| $TD_{15}$ (40° C.) | — | 47.0 | 51.2 | — | — | — | 57.7 | — | 51.2 | 53.3 | 42.9 | 57.0 | 52.3 |
| $TF_5$ (25° C.) | — | 66.0 | 69.1 | 67.8 | 67.1 | — | 73.0 | — | 67.0 | 70.0 | 66.0 | 73.7 | 69.7 |
| $DT_{15}$ (40-2) | — | 19.0 | 19.2 | — | — | — | 16.4 | — | 19.9 | 22.9 | 21.9 | 21.8 | 22.1 |
| R.I. | — | 1.599 | — | — | — | — | — | — | — | — | — | — | — |
| Abbe | — | 42.4 | — | — | — | — | — | — | — | — | — | — | — |
| Dens. | — | 2.73 | — | — | — | — | — | — | — | — | — | — | — |

I claim:

1. A photochromic glass having a refractive index between 1.585–1.610, an Abbe number higher than 41, a density less than 2.80 g/cm³, being capable of receiving an antireflection coating, and which, in a thickness of 2 mm, exhibits (a) a light transmittance in the clear state ($T_o$) of greater than or equal to 85%, (b) a light transmittance in the darkened state after exposure for 15 minutes to actinic radiation ($TD_{15}$) over the temperature range from 0°–25° C. of less than 48%, (c) a light transmittance in the darkened state after exposure for 15 minutes to actinic radiation ($TD_{15}$) at 25° C. of more than 20%, (d) a fading rate at ambient temperature (20°–25° C.) such that the glass demonstrates a light transmittance ($TF_5$) of at least 60% within five minutes after withdrawing from actinic radiation, (e) a difference in light transmittance in the darkened state over the temperature range from 25°–40° C. of less than 23 points of the degree of transmittance, and (f) a difference in absolute value of light transmittance in the darkened state before and after exposure at 280° C. for one hour, that exposure simulating the application of an anti-reflection coating, of less than five points of transmittance; said glass consisting essentially, in weight percent on the oxide basis, of:

| | | | |
|---|---|---|---|
| $SiO_2$ | 43–52 | MgO | 0–5 |
| $B_2O_3$ | 12.5–18 | CaO | 0–5 |
| $Al_2O_3$ | 0–3 | SrO | 0.8–9 |
| $ZrO_2$ | 3–8 | BaO | 1–9 |
| $Li_2O$ | 1.5–3.5 | $K_2O$ | 2–9 |
| $Na_2O$ | 0.3–3 | $TiO_2$ | 2–8 |

| | -continued | |
|---|---|---|
| Nb$_2$O$_5$ | 4-9 | | with the provisos that:
  $7 < X_2O < 12$ where $X_2O = Li_2O + K_2O$
  $2 < XO < 12$ where $XO = MgO + CaO + SrO + BaO$
  $12 < X_2O + XO < 20$
  $15 < ZrO_2 + TiO_2 + Nb_2O_5 < 22$
  $ZrO_2 + Al_2O_3 \leq 10$
  $Nb_2O_5 + Al_2O_3 \leq 9$
  $0.15 < Li_2O/X_2O < 0.40$ and of photochromic elements in the following proportions expressed in percent by weight:

| Ag | 0.100–0.175 | Br | 0.093–0.180 |
|---|---|---|---|
| Cl | 0.140–0.350 | CuO | 0.0080–0.0300 | where the Ag, Cl and Br contents are as analyzed in the glass and the CuO content is as calculated from the glass batch, with the provisos that:
  $Ag + Br > 0.21$
  $Br + Cl > 0.24$.

2. A glass according to claim 1 which exhibits a TF$_5$ of more than 62%, a difference in light transmittance in the darkened state over the temperature range from 25°–40° C. of less than 20 points of transmittance, and a difference in absolute value of light transmittance in the darkened state before and after exposure at 280° C. for one hour, that exposure simulating the application of an anti-reflection coating, of less than four points of transmittance, said glass consisting essentially, in weight percent on the oxide basis of:

| SiO$_2$ | 43-50 | K$_2$O | 3-8 |
|---|---|---|---|
| B$_2$O$_3$ | 12.5-17 | CaO | 0-3 |
| Al$_2$O$_3$ | 0-1.5 | SrO | 1-7 |
| ZrO$_2$ | 3-8 | BaO | 1-7 |
| Li$_2$O | 1.5-3 | Nb$_2$O$_5$ | 5-9 |
| Na$_2$O | 0.3-2.5 | TiO$_2$ | 3-7 | and of photochromic elements in the following proportions expressed in percent by weight:

| Ag | 0.100–0.155 | Br | 0.100–0.150 |
|---|---|---|---|
| Cl | 0.160–0.310 | CuO | 0.0120–0.0200 | with the provisos that
  $Ag + Br > 0.22$
  $Br + Cl > 0.27$.

3. A glass according to claim 1 exhibiting a brown color containing up to 6 ppm total of Pd and/or Au and up to 0.15% total of at least one oxide selected from the group consisting of As$_2$O$_3$, Sb$_2$O$_3$, and SnO$_2$.

* * * * *